United States Patent [19]
Wiersma

[11] 4,256,454
[45] Mar. 17, 1981

[54] LIFTING PLATE FURNACE

[75] Inventor: Tjeerd G. Wiersma, Nijmegan, Netherlands

[73] Assignee: Smit Ovens Nijmegen BV, Nijmegan, Netherlands

[21] Appl. No.: 56,942

[22] Filed: Jul. 12, 1979

[30] Foreign Application Priority Data

Jul. 15, 1978 [DE] Fed. Rep. of Germany ....... 2831251

[51] Int. Cl.³ .......................... F27D 3/00; F27D 3/12
[52] U.S. Cl. ................................... 432/241; 432/122; 432/239
[58] Field of Search ...................... 432/122, 239, 241

[56] References Cited
U.S. PATENT DOCUMENTS

| | | |
|---|---|---|
| 3,184,224 | 5/1965 | Shelley ............................ 432/122 X |
| 3,633,885 | 1/1972 | Beck ................................... 432/122 |
| 3,656,720 | 4/1972 | Western et al. ...................... 432/122 |
| 3,861,659 | 1/1975 | Evenstad ............................ 432/234 |
| 3,985,496 | 10/1976 | Eickelberg .......................... 432/122 |
| 4,116,619 | 9/1978 | Beck ................................... 432/122 |

Primary Examiner—John J. Camby
Attorney, Agent, or Firm—Cushman, Darby & Cushman

[57] ABSTRACT

A furnace having a flue through which plates bearing products to be fired are advanced. A plurality of rams are mounted below the plates for lifting the plates off of supports in the flue. A mechanism is also provided to move the rams parallel to the direction of advance. To advance the products along the flue, the rams lift the plates. The rams are then advanced in a forward direction, after which the plates are lowered onto a flue supports. The rams are then returned to their original position and the cycle is repeated.

15 Claims, 11 Drawing Figures

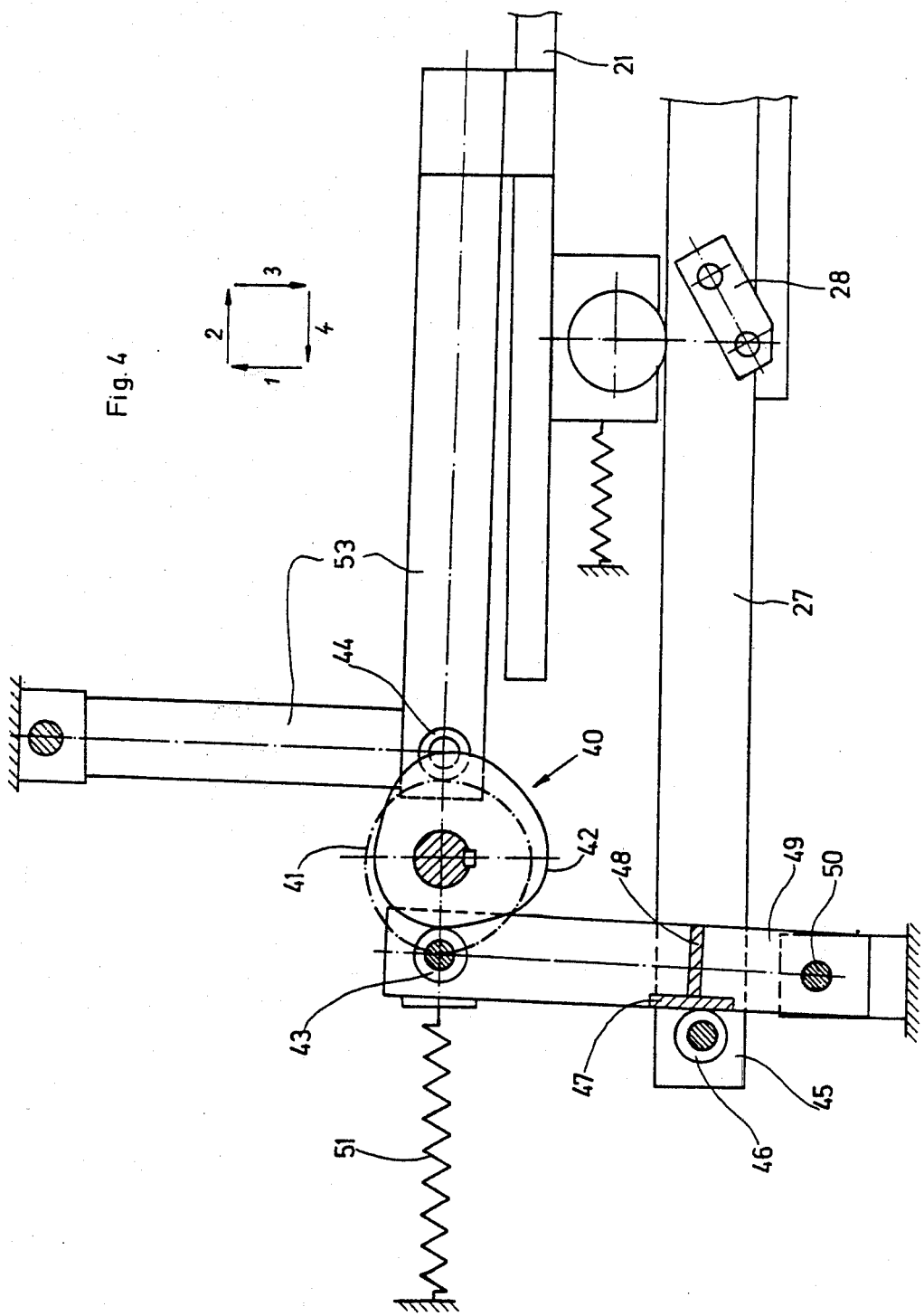

LIFTING PLATE FURNACE

The present invention relates to a furnace having a furnace flue provided with laterally and, optionally, centrally positioned supports or abutments on which bearing plates for the products to be fired are placed with lateral support and so as to be allowed to be lifted off, and a lifting device adapted to lift off said bearing plates from the supports from below, to advance said bearing plates in a direction of transport and to lower said bearing plates onto said supports after their travel through one step length.

Two basic principles are known in multiple-hearth roasters or furnaces. One principle relates to the so-called pusher plate furnace wherein a series of plates (hearths) on which the material to be fired rests, are advanced in conveying direction by means of a pusher mechanism provided at the forward end of the furnace. A furnace of this type is described, for example, in the laid-open German patent application No. 1 948 724. It has been found that thrust plate (hearth) furnaces suffer from drawbacks which limit their application. During material transport, the entirety of the friction and inertia forces induced by the pusher plates and the material to be fired thereon must be absorbed by the forwardmost plate, such that each plate must have a given thickness. Thus, the dead weight of the pusher plates is relatively great. This also results in an undesirably high thermal capacity, aggrevating control of the temperature profile interiorly of the furnace and causing high energy losses. Besides, the travel path of the thrust plates must be defined with high accuracy, because even smaller deviations from an ideal line would result in the pusher plates becoming dislodged from their interlocking assembly, thereby to cause shut-down of the furnace.

However, another construction is known in which a furnace is actually provided with plates (hearths) of the type as outlined above, while a lifting beam is provided underneath the plates to raise or lift the assembly of the plates, advance this assembly by one step, and thereafter lower the plates. A furnace of this kind is disclosed in U.S. Pat. No. 3,633,885 (Walking beam furnace). A transporting mechanism in the furnace flue can be omitted; in this case, only a lifting beam adapted to be raised and lowered is provided below the plates to be transported and carrying the material to be fired. However, the lifting beam furnace according said U.S. patent likewise suffers from certain drawbacks in view of which an improvement of this furnace seems to be advisable. Owing to the relatively large surface area of the lifting beam which functions as a kind of bottom, a pumping action is produced within the cavity underneath the combustion chamber and receiving the lifting beam, which action draws down part of the protective or inert gas atmosphere from the combustion chamber or disturbs the temperature and the composition of this atmosphere. Besides, heating means can be provided only above the material to be fired, because below this material, i.e. adjacent the lifting beam, there is not sufficient room, for structural reasons, to receive heating coils in a practically useful number. Owing to this construction, it is not readily possible to keep the temperature constant or to produce a given temperature profile across the length of the furnace and, if applicable, across its width. Finally, owing to the structural principle of U.S. Pat. No. 3,633,885 it is not feasible to move in synchronism a plurality of side-by-side arranged plate series carrying material to be fired; according to the prior art, thus, a single-line plate (hearth) row only can be kept in movement at a time. This fact therefore necessitates relatively long furnaces if a given throughput of material to be fired is to be obtained.

In view of these facts, it is the object of the present invention to depart from the principle of the pusher plate (hearth) furnace, but nevertheless to make use of the principle of the lifted and stepwisely advanced plates, and thereby to solve particularly the following objects or problems:

(a) Lifting and lowering of the lifting element below the plates should result in as little as possible a pumping action, so as to affect as little as possible the temperature and especially the composition of the inert gas atmosphere;

(b) the structure should allow to provide heating devices even underneath the plates carrying the material to be baked, such that a substantially constant temperature may be maintained even across the width of the furnace flue;

(c) further, the structure or construction should allow to increase the width of the furnace, such that the plates carrying the material to be baked may be arranged in a plurality of juxtaposed rows;

(d) energy losses should be kept at a minimum, by keeping the dead weight/net weight ratio between plates and material as low as possible.

These and further objects becoming apparent to one skilled in the art from the following specification, are solved by a furnace of the type as outlined at the beginning, wherein the lifting device provided below the bearing plates comprises separate rams with supporting plates being positioned on the tops of these rams, which plates form a longitudinally substantially continuous covering.

In contrast with the furnace according to U.S. Pat. No. 3,633,885 wherein a rigid beam, i.e. a movable furnace bottom, raises the bearing plates in discrete steps, in the present instance the lifting element proper is formed of separate rams carrying on their tops movably placed plates or panels, so-called supporting plates, the length of which need not be identical to the length of the bearing plates.

The bearing plates and the underlying supporting plates may be formed of a relatively thin, temperature resistant material. In order to maintain a statically defined supporting contact between both types of plates even when slightly curved bearing plates are used, the supporting plates are provided, on their upper sides, with webs or flanges on which the bearing plates rest during the lifting or raising stroke.

During transport, the bearing plates may become displaced or otherwise dislodged from their exact alignment with the furnace axis. In order to avoid this situation, in an embodiment of the invention the lining brickwork is provided with guide means, e.g. a guide strap or flange which is preferably positioned to be slightly bevelled laterally so as to inhibit migration of the plates.

The rams providing for the lifting movement may be embedded in relatively small ducts or passages in the bottom brickwork of the combustion chamber, such that their "pumping" is extremely small. The upper ends of the rams are provided with recesses into which depending tongues provided at the front sides of the supporting plates engage. These tongues make sure that the supporting plates are prevented from sliding off or from being withdrawn from the rams during movement.

Up and down movement as well as longitudinal movement of the rams are effected by virtue of the rams being adapted to be moved, for instance, through lifting rods mounted to a wheeled lifting beam adapted to be raised and lowered and forming part of a carriage mounted for vertical and longitudinal movement. This construction allows movement to take place in which the (vertical) stroke length is between 10 and 25 mm and the step length is between 5 and 30 mm. Naturally, these values are only reference values. Tests have shown these values to be advantageous.

The disclosure of further subclaims will become apparent from the following specification.

Below, the present invention is explained by referring to embodiments of the lifting plate furnace according to the invention as illustrated in the drawings, wherein:

FIG. 4 shows a drive mechanism (detail) according to another embodiment;

Figure 1:
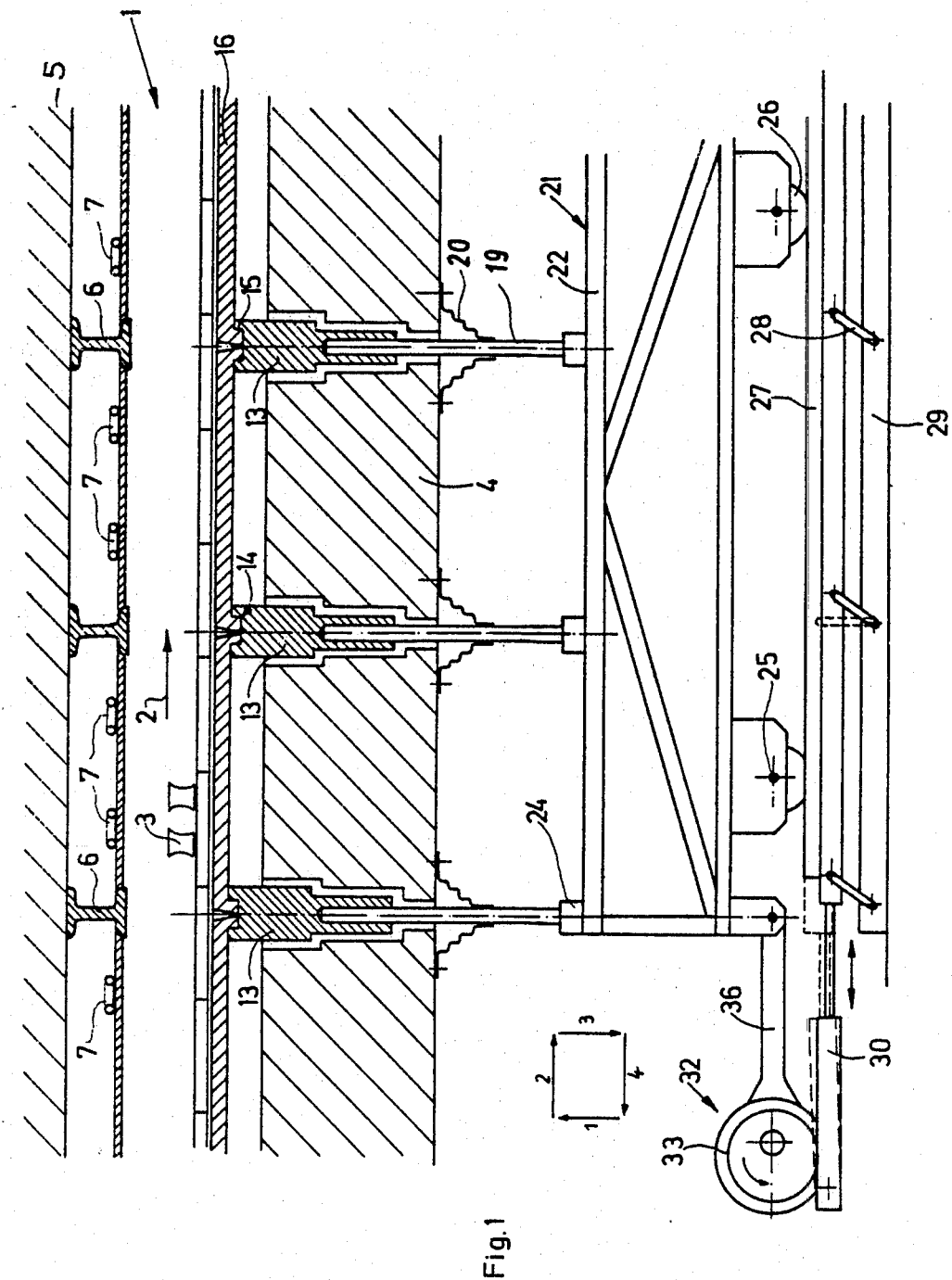
FIG. 1 is a longitudinal sectional view of a portion of the lifting plate furnace.

FIG. 1 is a longitudinal sectional view of a lifting plate furnace operating with stepwise advancing movement of the products to be fired in accordance with the invention. The furnace flue 1 having an approximately rectangular cross-section, is passed through by the products 3 in the direction of transport (arrow 2). The interior of the furnace may be divided into various sections or chambers longitudinally of the furnace, which sections subdivide the furnace into several heating zones, or wherein different atmospheres may be produced by feeding different gases to these sections.

The furnace flue 1 has all four sides thereof bounded by a brickwork consisting of high temperature-resistant ceramic material, such as $Al_2O_3$-$SiO_2$ mixtures of conventional type. Further, the chamber or compartment is insulated by means of rock wool inserts or layers and enclosed within a housing.

The roof 5 of the furnace flue 1 is supported by transverse beams 6 between which the heating elements 7 are placed onto plates. The sidewalls (compare FIG. 2) of the furnace flue or compartment are formed with stepped shoulders 8, 9. The shoulder designated by numeral 9 supports bearing plates 10 laterally applied thereto and on which the products 3 rest. Other supports are formed by webs or flanges 11 formed in the bottom 4 of the combustion chamber, said flanges being of sufficient width to serve as abutments for bearing plates placed onto them on either side. Flanges 11 and steps 9 are arranged in a symmetrical pattern relative to the axis of the furnace flue. The cavities 12 which can be seen below the bearing plates form circular holes in the bottom.

Figure 2:
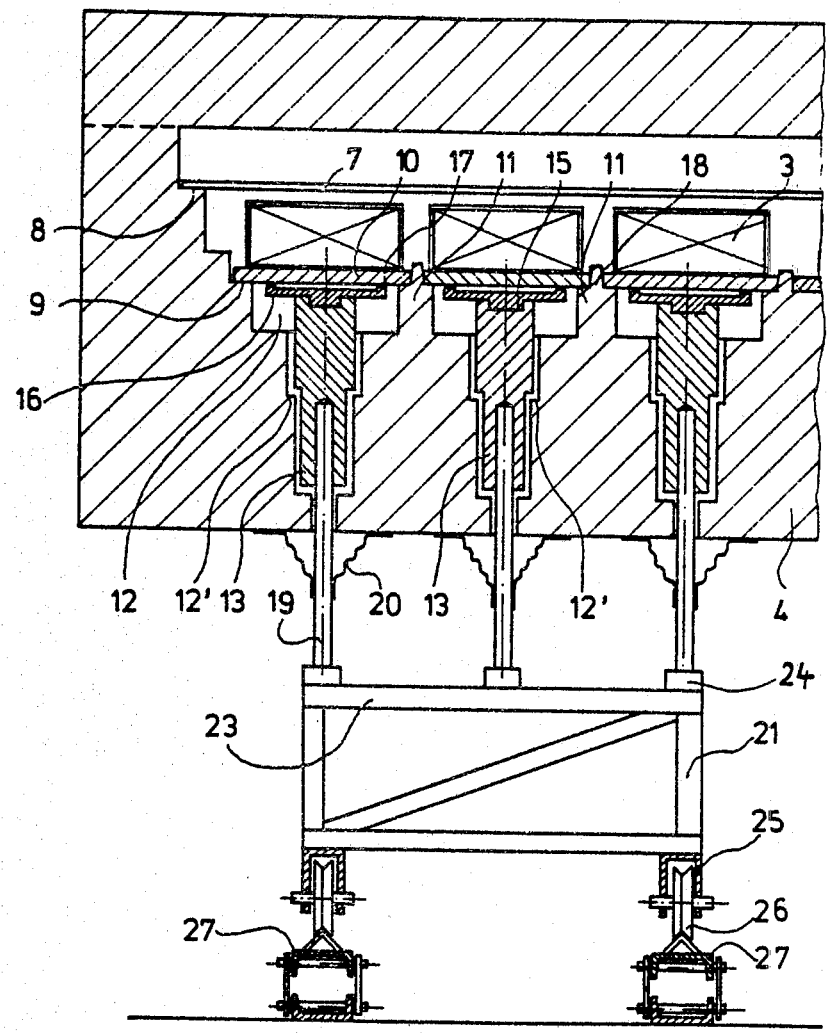
FIG. 2 shows a cross-sectional view thereof.
Figure 3:
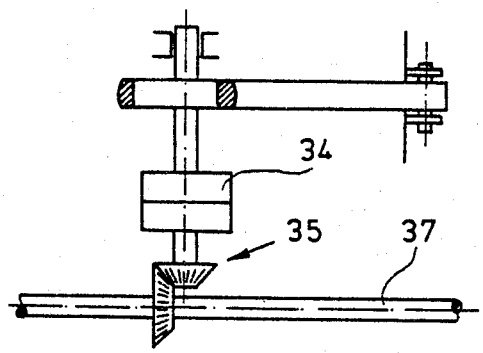
FIG. 3 shows a detail of the drive mechanism.

As shown in FIG. 2, flanges 11 are further provided with vertically protruding, laterally bevelled guiding abutment flanges 18 which assume a lateral guiding or restraining function for the bearing plates 10.

The preferably rectangular bearing plates 10, e.g. of a size of 300×150 mm with a thickness of 10 mm, which contact each other, but which are not integrally connected to each other, form a substantially continuous supporting or bearing surface. Preferably, these plates are formed of sintered SiC material provided with a protective layer; more particularly, so-called sandwich panels are involved. The plates 10 are moved in the direction of transport in steps, as will be explained below.

The bottom 4 of the furnace has provided therein ducts 12' which taper by increments in downward direction and in which rams 13 are mounted for vertical upward and downward movement. Still further, a portion of the front-side edge of supporting plates 16 each rests on the upper end of the respective ram. Accordingly, the length of the supporting plates 16 is equal to the spacing between the rams 13. The supporting plates which are preferably formed of nitride-bonded SiC mixtures, carry the bearing plates 10. The supporting plates are designed for high thermal conductivity and low thermal stress.

Tongues 15 are each provided on the front face of the supporting plates 16; the width of these tongues is equal to about one-fourth of the width of said supporting plates. The length of the supporting plates is 2½ times the length of bearing plates 10 which rest on the supporting plates so as to define a substantially covering or deck. The plate tongues 15 inserted into the recesses 14 are sufficiently free to move during vertical movement of the rams, such that the rams may be raised, within certain limits, to different levels with the supporting plates assuming sloping attitudes.

As appears from FIG. 2, the width of the supporting plates 16 is slightly smaller than the width of the bearing plates 10. The lateral edges 17 protrude vertically above the center areas, such that the bearing plates are contacted by the supporting plates only in the region of edges 17 which form corresponding webs or flanges. This construction ensures constantly adequate supporting contact in the case of bending or buckling of the supporting plates. The tongues 15, lying on the axis of the respective plate, assume about one-fourth of the overall width of the plates. The tongues 15 may be formed integrally with the material of the supporting plates 16 or subsequently attached to these plates.

Rams 13 are supported by lifting rods 19 formed of metal tube material and each retained by a gas-tight, resilient bellows 20. The bellows 20 are formed of a conical rubber layer of a temperature resistant silicone rubber, each bellow sealing the associated lifting rod in gas-tight fashion in the manner of a collar. In this construction, the temperature resistance is not critical as the components are not heated to more than 150° C., even if a temperature of 1.500° C. exists in the furnace flue.

At their lower ends, the lifting rods 19 terminate on a carriage 21 provided with longitudinal braces 22 in the direction of the series of lifting rams 13 in the longitudinal direction of the furnace, and with transverse braces 23 perpendicularly thereto.

The carriage carries the lifting rods 19 through foot portions 24 provided with adjusting threads. Vertical fine adjustment of the lifting rods may be effected by means of said adjusting threads.

The carriage 21 rests, through bearing elements 25, on two pairs of wheels 26 which, in turn, are carried by a pair of vertically movable lifting rails 27. The movable upper lifting rails 27 are connected to the lower, stationary bearing rails 29 through mounting straps 28 having their ends pivotally connected to each other. A pistoncylinder assembly 30 serves to move the lifting rail 27 in the axial direction of the furnace with simultaneous vertical displacement of this rail.

Synchronous further movement of the carriage 21 is effected by means of an eccentric drive mechanism 32. An eccentrically mounted wheel 33 which is driven together with a bevel gear drive mechanism 35 through a magnetic coupling means 34, is operative to move a rod 36 to and fro. The drive shaft 37 of the gear mechanism rotates at a speed of e.g. 7.5 revolutions per minute. In this way, the carriage 21 is moved over a predetermined, small distance. The magnetic coupling means 34 interrupts such movement selectively when a given phase of movement is reached. The above described moving elements thus produce vertically upward and downward movement in combination with an axially reciprocating movement of the rams.

FIG. 4 shows a drive mechanism for the vertical and horizontal movement, wherein control of the carriage 21 is effected with the aid of a cam gear mechanism 40. A pair of cam discs 41 and 42 produce the horizontal and vertical movement, respectively, through rollers 43, 44 connected to portions of carriage 21 and rolling on the sides of said cam discs (roller 43 on cam 42 and roller 44 on cam 41). Both cam discs are mounted on the same shaft. The shape of the cam discs is determined in accordance with the given laws of motion.

Lifting rail 27 has mounted to one end 45 thereof a roller 46 rolling on the flat or planar face 47 of a beam 48 being rigidly connected to a lever 49. Lever 49 is pivotally mounted at 50, and it is drawn to the left by a tension spring assembly 51 (FIG. 4). The spring force of the spring assembly 51 partially compensates for the weight of the lifting plate assembly which loads the lifting rail 27 and draws the latter to the right through the mounting strap 28. When cam disc 42 rotates, the lever 49 is swung to the left, such that the lifting rail is lowered due to the strap 28 assuming an upright position. At the same time, cam disc 41 applies pressure to the carriage 21 in such a manner that the carriage is prevented from moving to the left concurrently, but rather performs vertical movement. The articulated, L-shaped lever or beam assembly 53 is spring loaded such that a predetermined position of roller 44 relative to the shaft of cam disc 41 is defined.

At the end of the lifting or vertical movement, by rotation of cam disc 41 the beam assembly 53 is displaced to the right by, for instance, 15 mm, in combination with the carriage. Then, the profile of the cam disc 42 becomes effective to provide for lowering of lifting rail 27, with the horizontal movement being stopped. In the lower dead center, the carriage is then returned to the left, whereby the bearing plates 10 are laid down.

On principle, in the embodiment according to FIG. 1 or 4 the lifting rail or beam and the supporting plates move in the same pattern as illustrated in the attached square diagrams showing motion phases 1 to 4.

In order to more clearly explain the motion sequence, this sequence is again described in connection with FIGS. 5a to 5d.

Figure 5A:
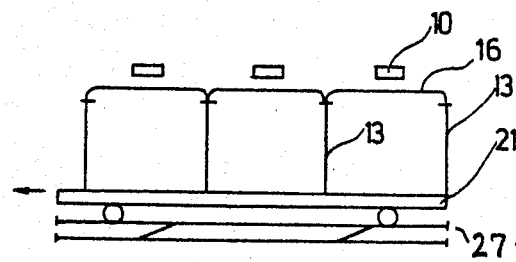
FIGS. 5a to 5d are schematical views of the motion sequence during transporting of the material to be fired.
Figure 5B:
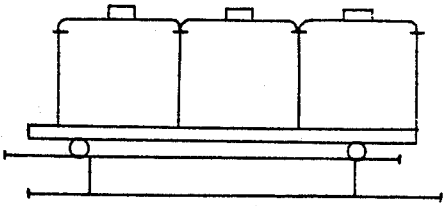
Figure 5C:
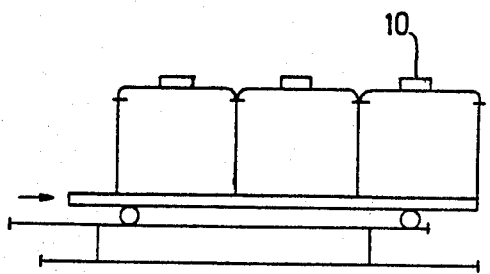
Figure 5D:
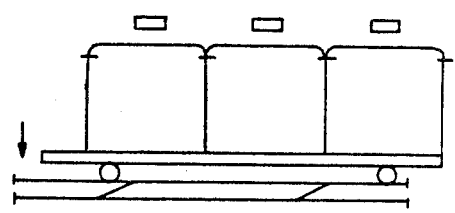

FIG. 5a shows the rams 13 in their lowermost position, i.e. with the bearing plates 10 laid down. In this position, carriage 21 is drawn to be advance below bearing plates 10 (see arrow). The bearing plates 10 rest on shoulders 9 or flanges 11. In this phase in which no contact exists between supporting plates 16 and bearing plates 10, the carriage is drawn in opposition to the direction of transport or conveyance. In the subsequent phase (FIG. 5b), lifting rail 27 rises again to lift off the bearing plates via the supporting plates. Then advance movement (FIG. 5c) in transport direction is effected, whereby plates 10 are moved to the right. By proper correlation of the motions, supporting plates actually retain their positions relative to the rams, whereas the bearing plates resting thereon are advanced in the direction of transport. According to FIG. 5d, carriage 21 is thereafter lowered to assume the lowermost position, similarly as shown in FIG. 5a, but displaced to the right.

The length of carriage 21 may be coextensive with the length of the furnace; however, the carriage may be divided in sections across its length, too. Also, the spacings of the rams 13 or of the lifting rods 19 in longitudinal and transverse directions may chosen freely. It is possible to provide a plurality of rows of bearing plates across the width of the furnace. As to the operating sequence, a sequence of the lifting movement, depending on the speed of conveyance, of from about three to four strokes per minute at a speed of advance of from 2.7 to 3.6 m per hour has been found to be favorable. The height of stroke may be of the order of e.g. 15 mm±5 mm.

In addition to transport movement or advance in the direction of the arrow (2), proper change-over and synchronization of the movable components also allows return movement or reversal of the direction of movement to take place. Of course, the speed or rate of transport may be varied within wide limits.

Owing to the relatively small ducts which provide the minimum play which permits the rams to move, the pumping action on the inert gas is extremely low, such that disturbance of the temperature set and of the gas employed are unlikely to occur. Below the bearing plates 10 and in the space above the combustion chamber proper, heating elements may be situated which comprise, for example, bent or curved resistance wires placed on plates or panels. A structure of this kind is described e.g. in the laid-open German patent application No. 1,948,724. By the heating from below and above as well as due to the small thickness of bearing and supporting plates necessitated by mechanical requirements, all portions may be heated quite uniformly with minimum thermal loss, this noticeably reducing the required or released accumulation heat during heat-up and cooling.

In order to further reduce thermal losses, in a modification of the embodiment according to FIG. 1 a different configuration for the through holes of the rams passing through the bottom 4 of the furnace is chosen. This arrangement is contemplated to provide the following effects:

high temperature gradient from the interior of the furnace to the exterior;
 expedite removal and installation of the rams and ducts;
 minimum consumption of gas;
 operation free from trouble.

Figure 6:
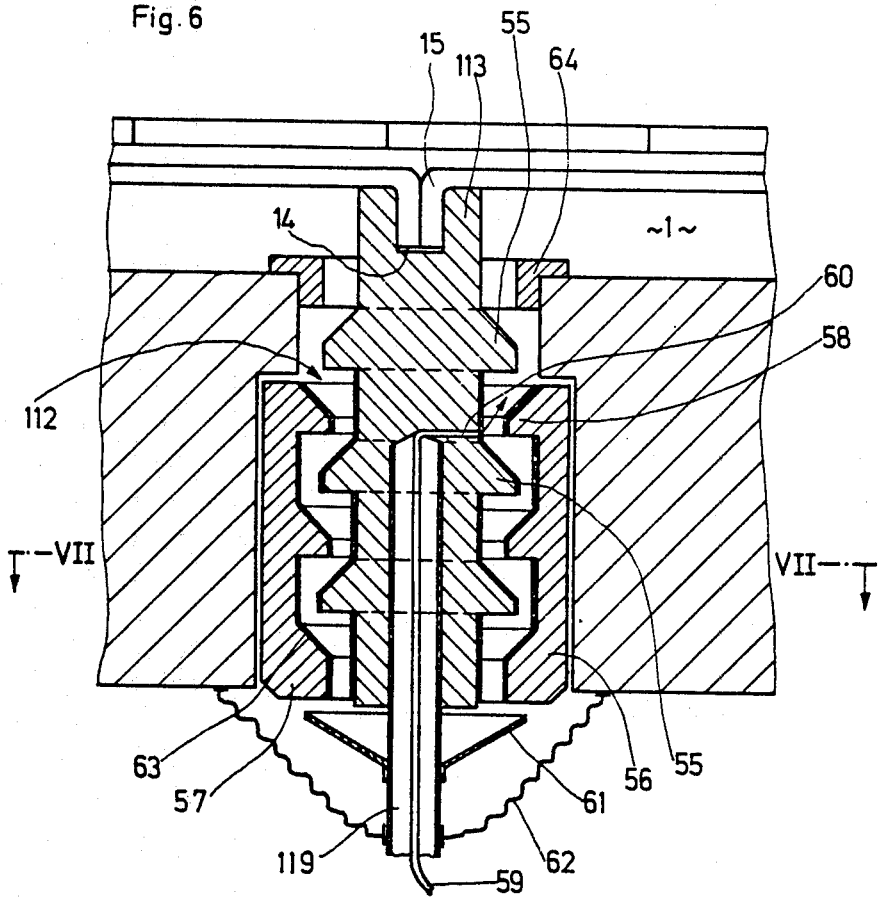
FIG. 6 shows the wall entrance or passage of a lifting rod according to another embodiment.

In the following, the construction of the ram passages is explained in greater detail by referring to FIGS. 6 and 7. FIG. 6 is a presentation similar to FIG. 1. Rams 113 placed onto lifting rods 119 are formed as upright (rectangular) blocks each having a plurality (three in the embodiment shown) of collars or beads 55 extending around the outer surface and having in cross-section approximately the shape of a desk or console, with the upwardly directed face being bevelled to slope in outward direction. Generally, it may be stated that the idea of the invention resides in the fact that rams are provided with beads which surround, at least partially, the outer surface of each ram, with the number of such beads being subject to variation, and that these rams are mounted in ducts which are likewise provided with protrusions overlapping each other to thereby shield thermal radiation emitted to the exterior. At the upper end, each ram 113 terminates in a head or tip end provided with a recess 14 into which the respective tongue 15 of the associated supporting plate engages. The material of the rams is a refractory silicate material of conventional kind; head portion and foot portion of each ram 113 may be formed of different materials. Rams 113 perform their vertical movement and reciprocating movement in the direction of transport in ducts 112 in the inner surface of which are formed with peripheral nose flanges 58 being vertically staggered relative to the beads 55. These ducts have a substantially rectangular or square configuration (see FIG. 7), with the lowermost two-thirds of the height of the ducts being of increased cross-sectional dimension. This portion of each duct has inserted thereinto a wall composed of two lining bricks 56, 57 formed with the inwardly directed nose flanges 58 which, in turn, have the same console-chaped cross-sectional profile as the beads 55 of the rams. As appears from the plan view of FIG. 7, the protrusions 55 and 58 slightly overlap each other. In this construction, the play in the direction of transport substantially exceeds the play in a direction perpendicularly thereto, as can also be gathered from FIG. 7.

Still further, the inner and outer sides and the protrusions 55 and 58 have their sloping faces and their sidewalls coated with a felt-type coating 63 of refractory fiber material, which coating acts to improve the sealing capability. Excess material is removed, and the play or clearance between the ram and the wall is minimized.

Also, the lifting rod 119 may be hollow such that it may be connected to a gas inlet or outlet via tube 59, whereby the gas exchange may take place between duct 112 and the furnace flue or compartment 1 through a bore or aperture 60 provided in the respective ram.

Still further, a collecting funnel 61 is mounted to the lifting rod 119 below the ram 119, which funnel collects the worn-off material and at the same time acts as a radiation protection element. Additionally, a bellow 62 is provided which establishes a gas-tight, flexible closure or seal. The upper end portion adjacent the furnace flue or compartment 1 is constricted by an annular brick 64 placed onto the edge of the duct.

Figure 7:
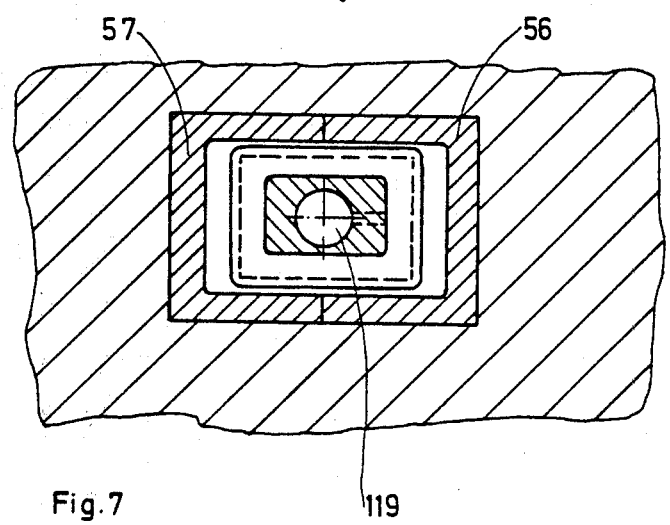
FIG. 7 is sectional view along lines VII—VII of FIG. 6.

The characteristic of the ram passage or bushing as shown in FIGS. 6 and 7 resides in the fact that overlap between the protrusions 55, 58 is substantially constantly ensured when the ram is moved in the direction of transport. Furthermore, radiation entering from above is largely reflected so as to be prevented from reaching the lower portion of the furnace. In fact, measurements have shown that a temperature of 1500° C. might exist in the upper portion of the furnace, whereas a temperature of only 130° could be measured in the vicinity of the bellows 62.

Feeding of the furnace is effected by advancing on transfer cars a plurality of juxtaposed rows or series of bearing plates in a panel-like configuration, and pushing these plates into the furnace in the form of a complete arrangement.

After the passage through the furnace, the plates may be removed in the same manner, and the fired material on the plates is transferred to further processing stations. Owing to the possibility of accomodating a plurality of rows in the increased width, and because it is possible to heat the furnace both from above and below the combustion chamber proper, the length of the furnace may be substantially reduced while maintaining capacity and passage time constant.

Figure 8:
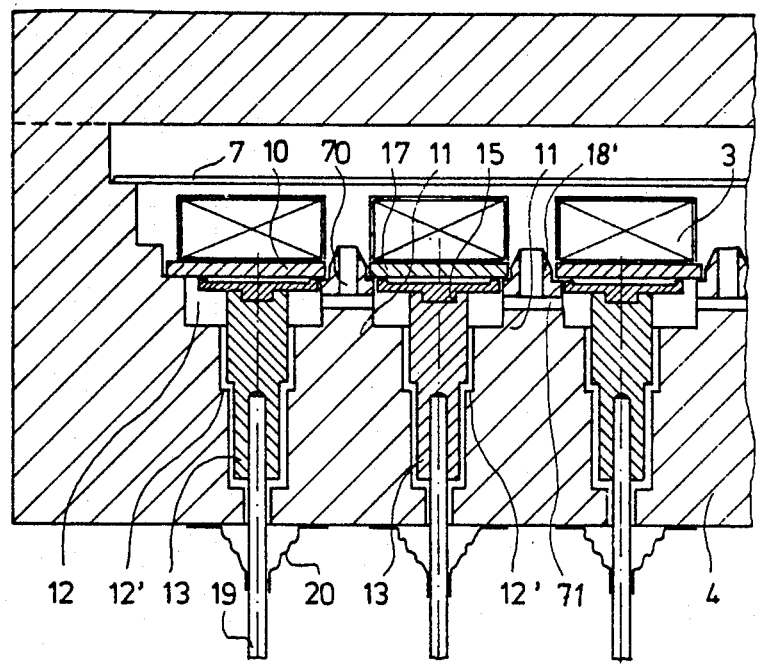
FIG. 8 is a sectional view of the combustion (firing) chamber according to a modified embodiment.

FIG. 8 shows a detail of other guiding abutment flanges 18' than those described in connection with FIG. 2. Flanges 18' have passing therethough bores or apertures 70, 71 forming a gas passage from the space below the supporting plates 16 to the space above these plates. In this way, the homogeneity of the gas atmosphere may be improved. The slightly bevelled guiding flanges may be provided for each bearing plate track, or they may be positioned at the sides only. The bevelled configuration is essential in order to expose the edges of the bearing plates during lifting movement thereof. When lowered an laid down, the bearing plates are precisely returned into their track.

What we claim is:

1. A furnace comprising:
   a furnace flue through which products to be fired are advanced between an inlet and an outlet;
   at least one bearing plate for supporting said products in said flue;
   means for supporting said plate on the bottom of said flue so that said bearing plate can be lifted, advanced and replaced;
   a plurality of rams mounted below said plate at separated locations along the direction of advance for lifting, advancing and replacing said plate; and
   means connected to said rams for operating said rams to lift, advance, and replace said plate.

2. A furnace as in claim 1, including a plurality of laterally extending bearing plates mounted side by side.

3. A furnace as in claim 1 or 2 wherein said supporting means includes flange members supporting said plate on either side thereof.

4. A furnace as in claim 1 including a plurality of support plates supporting said plate and having depending tongues and wherein each of said rams has a recess for receiving a tongue.

5. A furnace as in claim 1, wherein a plurality of ducts are formed in said bottom of said flue for each receiving a ram.

6. A furnace as in claim 5, wherein each ram includes a collar extending at least partially around the outer surface of that ram.

7. A furnace as in claim 6, including nose flanges extending around the inner walls of said ducts and being vertically staggered relative to said collars.

8. A furnace as in claim 7, further including bricks lining each said duct and wherein at least part of said nose flanges is formed facing the inner side of said lining bricks.

9. A furnace as in claim 8, including a pair of identical lining bricks installed into said duct in symmetrical relation to each other.

10. A furnace as in claim 9, wherein said duct is of a substantially rectangular cross-section, and said rams are of a substantially block-shaped configuration.

11. A furnace as in claim 7, wherein portions of the sidewalls and protrusions of each ram and/or of the inner side of said duct are provided with a felt-like coating.

12. A furnace as in claim 1, wherein said operating means includes a vertically movable lifting rail, a carriage for supporting said ram having wheels movable on said vertically movable lifting rail for moving said carriage longitudinally, said lifting rail moving said carriage vertically.

13. A furnace as in claim 12, including cam gear means for controlling vertical and horizontal movement of said carriage.

14. A furnace as in claim 1, wherein said lifting stroke of said rams is between 10 and 25 mm and a step length of from 5 to 30 mm.

15. A furnace as in claim 1, wherein said lifting rods are hollow so as to function as gas conduits.

* * * * *